(12) United States Patent
Chen et al.

(10) Patent No.: US 9,116,273 B2
(45) Date of Patent: Aug. 25, 2015

(54) BACKLIGHT MODULE AND DISPLAY APPARATUS

(71) Applicants: Shih Hsiang Chen, Guangdong (CN); Li-Yi Chen, Guangdong (CN); Dehua Li, Guangdong (CN)

(72) Inventors: Shih Hsiang Chen, Guangdong (CN); Li-Yi Chen, Guangdong (CN); Dehua Li, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 155 days.

(21) Appl. No.: 13/805,496

(22) PCT Filed: Nov. 23, 2012

(86) PCT No.: PCT/CN2012/085144
§ 371 (c)(1),
(2) Date: Dec. 19, 2012

(87) PCT Pub. No.: WO2014/067196
PCT Pub. Date: May 8, 2014

(65) Prior Publication Data
US 2014/0126242 A1    May 8, 2014

(30) Foreign Application Priority Data

Nov. 2, 2012    (CN) .......................... 2012 1 0431938

(51) Int. Cl.
*G02B 6/00* (2006.01)
*F21V 8/00* (2006.01)
(Continued)

(52) U.S. Cl.
CPC ............. *G02B 6/0068* (2013.01); *F21S 11/002* (2013.01); *G02B 6/4298* (2013.01); *F21S 11/00* (2013.01); *F21V 23/0464* (2013.01); *G02B 6/0006* (2013.01)

(58) Field of Classification Search
CPC .................... F21V 2008/001; F21V 2008/005; F21V 2008/006; F21V 17/164; F21V 23/0464; G02B 6/005–6/0015; G02B 6/0073; F21S 11/00; F21S 11/02; G02F 2001/133618; G02F 2001/13324; G02F 2001/133626; G02F 1/13318
USPC ........ 362/23.02, 23.09, 23.16, 551–552, 561, 362/600–634; 315/155–159; 385/28, 59, 385/70–71, 88, 115–116, 900
See application file for complete search history.

(56) References Cited

U.S. PATENT DOCUMENTS 4,263,594 A * 4/1981 Masucci ....................... 345/102
(Continued)

FOREIGN PATENT DOCUMENTS

CN        101782698 A    7/2010
(Continued)

*Primary Examiner* — Peggy Neils
*Assistant Examiner* — Zheng Song
(74) *Attorney, Agent, or Firm* — Kirton McConkie; Evan R. Witt

(57) ABSTRACT

The present invention provides a backlight module and a display apparatus. The display apparatus comprises the backlight module and a display panel. The backlight module comprises a light collector, optical fibers, a fiber light-outputting substrate and a light guide plate. The optical fibers are connected between the light collector and the fiber light-outputting substrate. The light guide plate is disposed at one side of the fiber light-outputting substrate. The fiber light-outputting substrate includes a plurality of light-outputting openings and a plurality of light sources. The present invention can use ambient light rays to form a backlight source.

9 Claims, 12 Drawing Sheets

(51) Int. Cl.
*G02B 6/42* (2006.01)
*F21S 11/00* (2006.01)
*F21V 23/04* (2006.01)

(56) References Cited

U.S. PATENT DOCUMENTS

| | | | | |
|---|---|---|---|---|
| 4,539,625 | A * | 9/1985 | Bornstein et al. | 362/576 |
| 5,293,437 | A * | 3/1994 | Nixon | 385/115 |
| 6,195,016 | B1 * | 2/2001 | Shankle et al. | 340/815.42 |
| 7,040,794 | B2 * | 5/2006 | Bernard | 362/555 |
| 8,207,676 | B2 * | 6/2012 | Hilgers | 315/152 |
| 2003/0002296 | A1 * | 1/2003 | Steiner et al. | 362/560 |
| 2005/0180706 | A1 * | 8/2005 | Jones | 385/115 |
| 2005/0180716 | A1 * | 8/2005 | Crafts | 385/137 |
| 2006/0007702 | A1 * | 1/2006 | Hsieh et al. | 362/611 |
| 2007/0091635 | A1 * | 4/2007 | Ladouceur et al. | 362/557 |
| 2008/0192458 | A1 * | 8/2008 | Li | 362/84 |
| 2008/0198620 | A1 * | 8/2008 | Bihr et al. | 362/603 |
| 2010/0053993 | A1 * | 3/2010 | Hong et al. | 362/606 |
| 2010/0061682 | A1 * | 3/2010 | Tsai | 385/81 |
| 2010/0073600 | A1 * | 3/2010 | Itoh et al. | 349/65 |
| 2011/0103088 | A1 * | 5/2011 | Wemmer | 362/555 |
| 2011/0242810 | A1 * | 10/2011 | Lopez Querol et al. | 362/249.02 |
| 2012/0243252 | A1 * | 9/2012 | Kim | 362/554 |
| 2013/0155643 | A1 * | 6/2013 | Meyer et al. | 362/2 |

FOREIGN PATENT DOCUMENTS

| | | |
|---|---|---|
| CN | 102073166 A | 5/2011 |
| CN | 102193247 A | 9/2011 |
| CN | 102494297 A | 6/2012 |
| JP | 2000231816 A | 8/2000 |
| JP | 2005091494 A | 4/2005 |

* cited by examiner

BACKLIGHT MODULE AND DISPLAY APPARATUS

FIELD OF THE INVENTION

The present invention relates to a backlight module and a display apparatus, and more particularly to a backlight module and a display apparatus using ambient light rays.

BACKGROUND OF THE INVENTION

Liquid crystal displays (LCDs) have been widely applied in electrical products. Currently, most LCDs are backlight type LCDs that comprise a liquid crystal display panel and a backlight module. According to the position of the light sources for providing LCDs with backlight, the backlight module can be classified into a side-light type or a direct-light type to provide a backlight for the liquid crystal display panel.

In general, light sources of the backlight module are light emitting diodes (LEDs) or cold cathode fluorescent lamps (CCFLs) which need phosphors to form white light rays which have a poorer color performance and a narrower color gamut, and thus it is difficult to achieve a real color of images. Furthermore, the light sources of the backlight module have a high energy consumption, especially for a large-size LCD.

As a result, it is necessary to provide a backlight module and a display apparatus to solve the problems existing in conventional technologies such as above-mentioned.

SUMMARY OF THE INVENTION

A primary object of the present invention is to provide a backlight module, wherein the backlight module comprises: a light collector configured to collect ambient light rays; a plurality of optical fibers connected to the light collector; a fiber light-outputting substrate connected to the optical fibers, wherein the fiber light-outputting substrate includes a plurality of light-outputting openings and a plurality of light sources, and the light-outputting openings are configured to output the light rays transmitted by the optical fibers; and a light guide plate disposed at one side of the fiber light-outputting substrate.

A secondary object of the present invention is to provide a backlight module, wherein the backlight module comprises: a light collector configured to collect ambient light rays; a plurality of optical fibers connected to the light collector; a fiber light-outputting substrate connected to the optical fibers, wherein the fiber light-outputting substrate includes a plurality of light-outputting openings and a plurality of light sources, and the light-outputting openings are configured to output the light rays transmitted by the optical fibers; a light guide plate disposed at one side of the fiber light-outputting substrate; and a luminous intensity detector configured to a detection signal to a processer of the backlight module, and the processer controls the light sources to emit light according to the detection signal, and the processer adjusts a current of the light sources according to the detection signal for controlling a luminous intensity of the light sources, and the light sources are turned off when the luminous intensity detected by the luminous intensity detector is higher than a predetermined threshold value.

A further object of the present invention is to provide a display apparatus, wherein the display apparatus comprises a display panel and a backlight module. The backlight module comprises: a light collector configured to collect ambient light rays; a plurality of optical fibers connected to the light collector; a fiber light-outputting substrate connected to the optical fibers, wherein the fiber light-outputting substrate includes a plurality of light-outputting openings and a plurality of light sources, and the light-outputting openings are configured to output the light rays transmitted by the optical fibers; and a light guide plate disposed at one side of the fiber light-outputting substrate.

In one embodiment of the present invention, the light sources are light emitting diodes (LEDs) or organic light emitting diodes (OLEDs).

In one embodiment of the present invention, the backlight module further comprises a luminous intensity detector configured to a detection signal to a processer of the backlight module, and the processer controls the light sources to emit light according to the detection signal.

In one embodiment of the present invention, the processer adjusts a current of the light sources according to the detection signal for controlling a luminous intensity of the light sources.

In one embodiment of the present invention, the light sources are turned off when the luminous intensity detected by the luminous intensity detector is higher than a predetermined threshold value.

In one embodiment of the present invention, the light sources are arranged between the light-outputting openings.

In one embodiment of the present invention, the light sources are turned on when a luminous intensity of the light rays outputted by the light-outputting openings is lower than the predetermined threshold value.

In one embodiment of the present invention, the backlight module further comprises a plurality fiber fixing collars attached to light-emitting ends of the optical fibers for fixing the optical fibers to the fiber light-outputting substrate.

In one embodiment of the present invention, each of the fiber fixing collars comprises a plurality of hooks, and the fiber light-outputting substrate further includes a plurality of fixing holes for latching the hooks of the fiber fixing collars.

In comparison to the problems existing in the conventional backlight module, the backlight module and the display apparatus of the present invention can use the ambient light rays to form the backlight source, thereby greatly reducing an energy consumption of light sources. Moreover, the ambient light can have a wide color gamut, and thus the display apparatus using the backlight module of the present invention can display images of real color for improving a display quality thereof. When the ambient light is not sufficient, the light sources of the fiber light-outputting substrate can emit light to compensate the brightness, so as to ensure that the backlight source of the backlight module can have a sufficient brightness. Furthermore, with the use of the fiber fixing collars, the light-emitting ends of the optical fibers can be precisely positioned and secured to the fiber light-outputting substrate, thereby ensuring a high efficiency for light energy utilization.

The structure and the technical means adopted by the present invention to achieve the above-mentioned and other objects can be best understood by referring to the following detailed description of the preferred embodiments and the accompanying drawings:

DETAILED DESCRIPTION OF THE PREFERRED EMBODIMENTS

Figure 1:
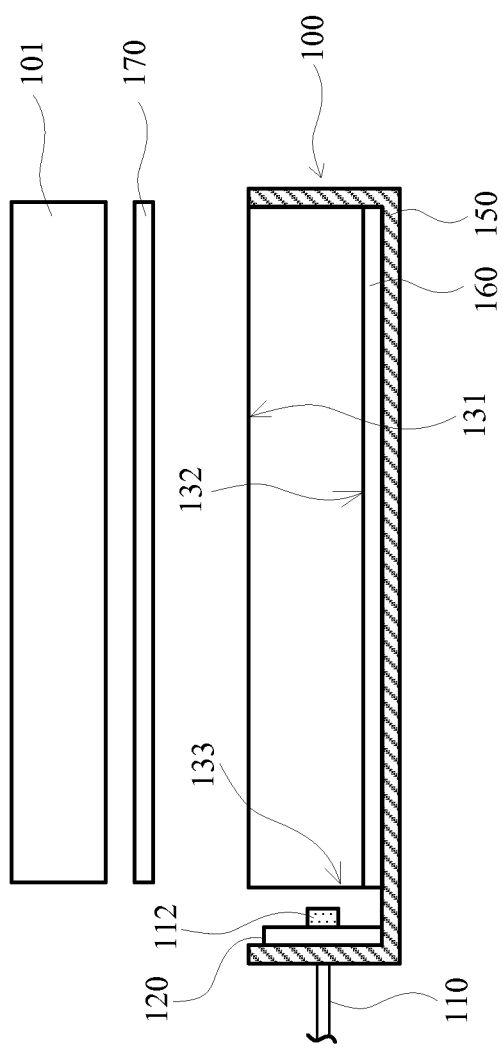
FIG. 1 is a schematic diagram showing a display apparatus according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Figure 2:
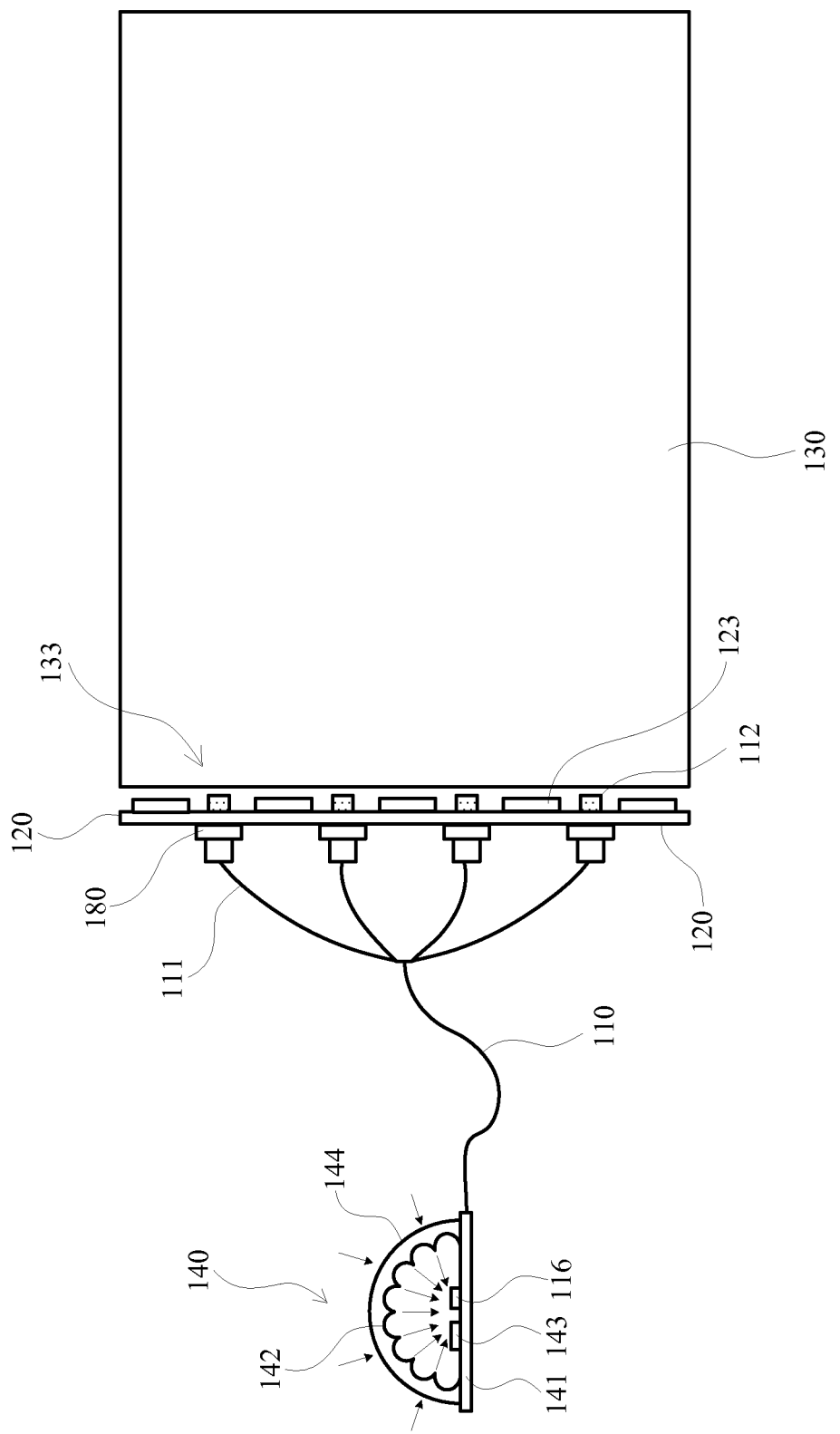
FIG. 2 is a schematic diagram showing a backlight module according to one embodiment of the present invention.

Referring to FIG. 1 and FIG. 2, FIG. 1 is a schematic diagram showing a display apparatus according to one embodiment of the present invention, and FIG. 2 is a schematic diagram showing a backlight module according to one embodiment of the present invention. In the present embodiment, the backlight module 100 is disposed opposite to a display panel 101 (such as a liquid crystal display panel), thereby forming the display apparatus (such as an LCD apparatus). The backlight module 100 comprises a plurality of optical fibers 111, a fiber light-outputting substrate 120, a light guide plate 130, a light collector 140, a back bezel 150, a reflective layer 160, at least one optical film 170 and a plurality of fiber fixing collars 180. The optical fibers 111 are connected to the light collector 140 for transmitting light rays. The fiber light-outputting substrate 120 is disposed between the optical fibers 111 and the light guide plate 130 for providing the light rays transmitted by the optical fibers 111 or emitted by a plurality of light sources 122 to the light guide plate 130. The light collector 140 is connected to the optical fibers 111 for collecting ambient light rays, such as sunlight or indoor light, so as to provide the light rays for the optical fibers 111. The light guide plate 130 is disposed on the back bezel 150, and the reflective layer 160 is formed between the back bezel 150 and the light guide plate 130 for reflecting the light rays. The optical film 170 is disposed above the light guide plate 130 for optical improvement. The fiber fixing collars 180 are attached to light-emitting ends 112 of the optical fibers 111, respectively, for fixing the optical fibers 111 to the fiber light-outputting substrate 120.

Referring to FIG. 2 again, the optical fibers 111 of the present embodiment can be bundled by a cover, so as to form an optical fiber bundle 110, thereby making it easier to be connected to the light collector 140. One end of the optical fiber bundle 110 is connected to the light collector 140, and the un-bundled optical fibers 111 are connected to the fiber light-outputting substrate 120.

Figure 3:
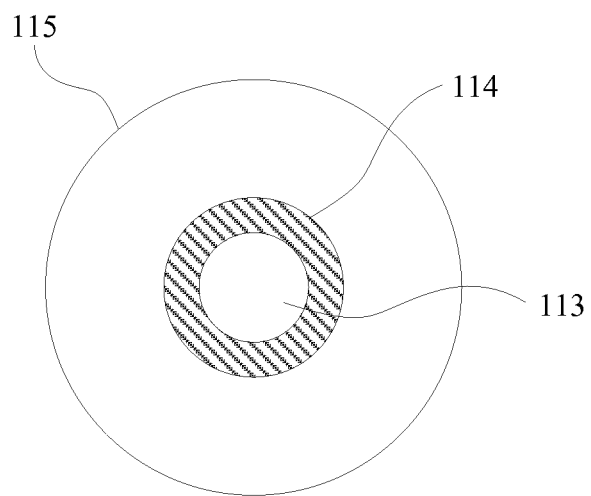
FIG. 3 is a schematic diagram showing the optical fiber according to one embodiment of the present invention.

Referring to FIG. 3, a schematic diagram showing the optical fiber according to one embodiment of the present invention is illustrated. Each of the optical fibers 111 may have a fiber core 113, a cladding layer 114 and a buffer layer 115. The fiber core 113 may be made of silica or PMMA for transmitting the light rays. The cladding layer 114 may be made of a hard polymer for cladding the fiber core 113. The buffer layer 115 may be made of tetrafluoroethene for protecting the optical fibers 111 from damage.

Figure 4:
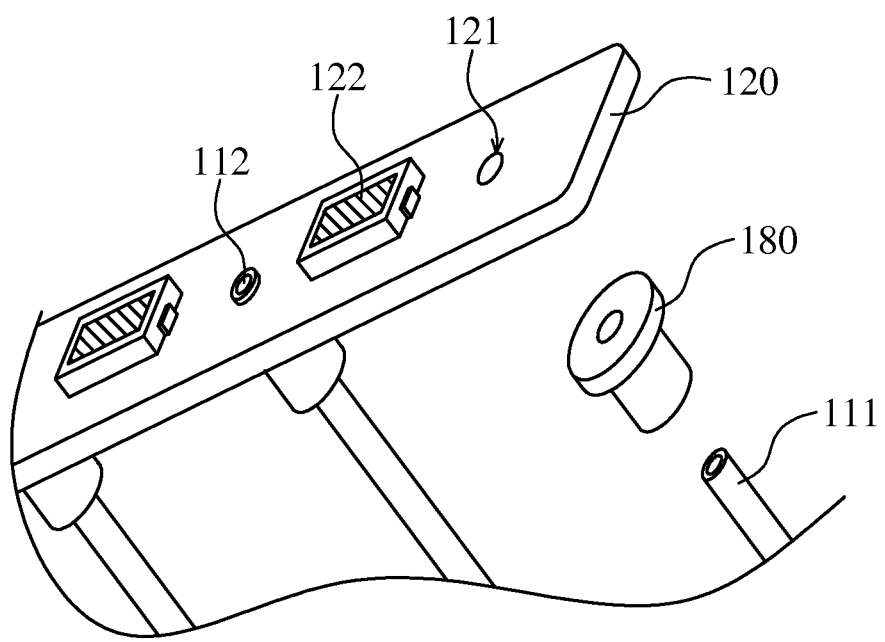
FIG. 4 is a schematic diagram showing the optical fiber and the fiber light-outputting substrate according to one embodiment of the present invention.
Figure 5:
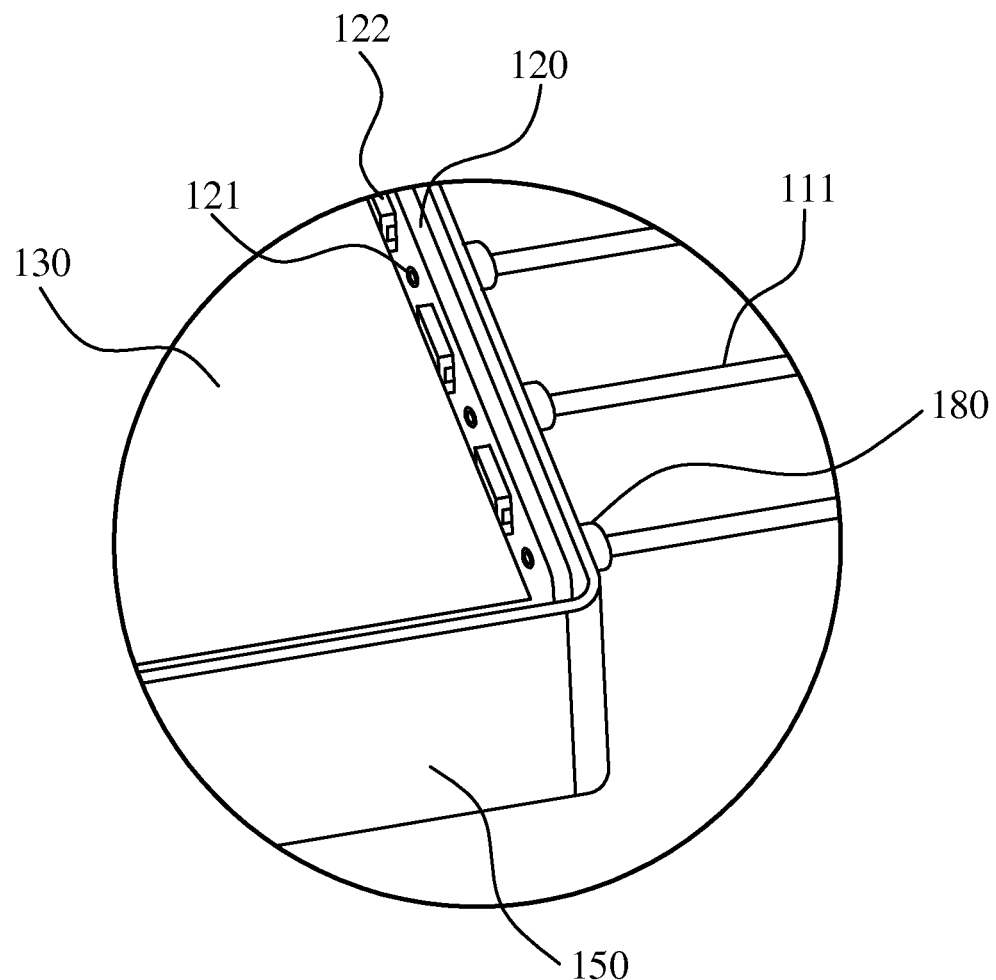
FIG. 5 is a partially enlarged view showing the backlight module according to one embodiment of the present invention.

Referring to FIG. 4 and FIG. 5, FIG. 4 is a schematic diagram showing the optical fiber and the fiber light-outputting substrate according to one embodiment of the present invention, and FIG. 5 is a partially enlarged view showing the backlight module according to one embodiment of the present invention. The fiber light-outputting substrate 120 of the present embodiment is disposed between the optical fibers 111 and the light guide plate 130. The substrate of the fiber light-outputting substrate 120 may be a circuit board which comprises a plurality of light-outputting openings 121 and a plurality of light sources 122. The light-outputting openings 121 and the light sources 122 are disposed to face a light input side surface 133 of the light guide plate 130 for providing the light rays for the light guide plate 130. The light-outputting openings 121 may be through holes for exposing the light-emitting ends 112 of the optical fibers 111, such that the light rays transmitted by the optical fibers 111 can be outputted to the light guide plate 130 by the light-outputting openings 121 of the fiber light-outputting substrate 120. In this case, an arrangement pitch of the light-outputting openings 121 may be equal to or less than 16 mm, so as to ensure that the light rays are dispersedly emitted into the light guide plate 130 for forming a uniform plane light source. A diameter (or a width) of each of the light-outputting openings 121 may be equal to or less than 2.5 mm, such that the light rays transmitted by the optical fibers 111 can be entirely outputted by the light-outputting openings 121.

In this embodiment, the light sources 122 may be LEDs or organic light emitting diodes (OLEDs). The light sources 122 may be arranged between the light-outputting openings 121. When the light rays collected by the light collector 140 are not sufficient to provide for forming the plane light source, the light sources 122 of the fiber light-outputting substrate 120 can provide additional light rays for the light guide plate 130, so as to ensure that the backlight formed by the backlight module 100 has a sufficient brightness. More specifically, when a luminous intensity of the light rays outputted by the light-outputting openings 121 of the fiber light-outputting substrate 120 is lower than a predetermined threshold value, the light sources 122 of the fiber light-outputting substrate 120 are turned on to emit light rays for compensating the brightness of the backlight module 100.

Figure 6:
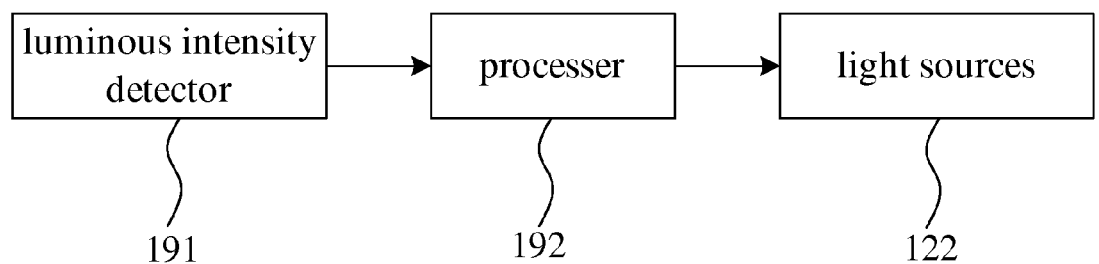
FIG. 6 is a control block diagram showing a luminous intensity detector and a processer according to one embodiment of the present invention.

Referring to FIG. 6, a control block diagram showing a luminous intensity detector and a processer according to one embodiment of the present invention is illustrated. The backlight module 100 can further comprise the luminous intensity detector 191 for detecting the luminous intensity. The luminous intensity detector 191 may disposed inside the backlight module 100, such as on the fiber light-outputting substrate 120 or inside the back bezel 150. When the luminous intensity of the light rays transmitted by the optical fibers 111 is sufficient, such as when the luminous intensity detected by the luminous intensity detector 191 is higher than the predetermined threshold value, the light sources 122 are turned off without emitting light for saving power. When the luminous intensity of the light rays transmitted by the optical fibers 111 is not sufficient, such as when the luminous intensity detected by the luminous intensity detector 191 is lower than the predetermined threshold value, the intensity detector 191 can transmit a detection signal to the processer 192 of the backlight module 100. Subsequently, the processer 192 can control the light sources 122 to emit light according to the detection signal for compensating the brightness of the backlight module 100. Moreover, the processer 192 can adjust a current of the light sources 122 (such as LEDs) according to the detection signal for controlling the luminous intensity of the light sources 122, and thus the light guide plate 130 can form a plane light source of a constant brightness.

Referring to FIG. 1 again, the light guide plate 130 of the present embodiment is disposed at one side of the fiber light-outputting substrate 120. The light guide plate 130 may be made by the method of injection molding, and the material thereof may be photo-curable resin, polymethylmethacrylate (PMMA) or polycarbonate (PC) for guiding the light rays transmitted by the optical fibers 111 toward the liquid crystal display panel 101. The light guide plate 130 includes a light output surface 131, a light reflection surface 132 and the light input side surface 133. The light output surface 131 is formed on one side of the light guide plate 130 and faces to the liquid crystal display panel 101. The light output surface 131 may include a cloudy surface or a plurality of scattering patterns to uniform the light rays outputted from the light guide plate 130, thereby preventing the situation of mura. In another embodiment, the light output surface 131 may include a plurality of protruding structures (not shown) to modify the direction of the light rays, thereby condensing the light rays and enhancing a brightness thereof, wherein the protruding structures may be prism-shaped structures or semicircle-shaped structures. The light reflection surface 132 is formed opposite to the light output surface 131 for reflecting light thereto. In the present embodiment, the light reflection surface 132 of the light guide plate 130 is parallel to the light output surface 131. The light reflection surface 132 may have a plurality of light guiding structures (not shown) formed thereon to guide light to the light output surface 131. The light guiding structures of the light reflection surface 132 may be a continuous V-shaped structure, i.e. V-cut structures, a cloudy surface or scattering patterns, thereby guiding the light rays transmitted by the optical fibers 111 to be outputted from the light output surface 131. The light input side surface 133 may be formed on one side or two opposite sides of the light guide plate 130 and facing the light-outputting openings 121 of the fiber light-outputting substrate 120 for allowing the light rays transmitted by the optical fibers 111 to be inputted into the light guide plate 130. The light input side surface 133 may have V-shaped structures (V-cut structures), S-shaped structures or a rough surface structure (not shown) to raise light incidence efficiency and light coupling efficiency.

Referring to FIG. 2 again, the light collector 140 can be disposed outside the display apparatus (such as outdoors or indoors) and connected to one end of the optical fiber bundle 110 for collecting the ambient light, such as sunlight. The light collector 140 can include a base 141, an optical lens 142, a photo-sensor 143 and a cover 144. The optical lens 142 and the photo-sensor 143 can be disposed on the base 141. The optical lens 142 is configured to collect the ambient light and provide the collected light rays to an input end 116 of the optical fiber bundle 110. The photo-sensor 143 is configured to detect the ambient light for controlling the base 141 to rotate according an ambient light source, such as sun, thereby improving a light collection efficiency. The cover 144 is configured to encapsulate the optical lens 142 and the photo-sensor 143. Furthermore, the cover 144 may have an ultraviolet ray filter layer (not shown) to filter ultraviolet rays in the ambient light rays.

Referring to FIG. 1 again, in the present embodiment, the back bezel 150 may be made of an opaque material, such as plastic, metal or any combination material thereof for carrying the fiber light-outputting substrate 120 and the light guide plate 130, wherein the back bezel 150 may have through holes (not shown) to allow the optical fibers 111 to pass through. The reflective layer 160 (or a reflective sheet) is preferably formed on the light reflection surface 132 of the light guide plate 130, and merely exposes the light input side surface 133 for allowing light to be inputted and the light output surface 131 allowing light to be outputted. The reflective layer 160 may be made of a highly reflective material, such as any combination of alloys Ag, Al, Au, Cr, Cu, In, Ir, Ni, Pt, Re, Rh, Sn, Ta, W, Mn, and a white reflective paint with etiolation-resistant and heat-resistant properties or any combination thereof for reflecting light. The optical film 170 may be a diffuser, a prism sheet, a turning prism sheet, a brightness enhancement film (BEF), a dual brightness enhancement film (DBEF), a diffused reflective polarizer film (DRPF) or any combination thereof disposed above the light guide plate 130 for improving an optical effect of light rays outputted from the light guide plate 130.

Figure 7:
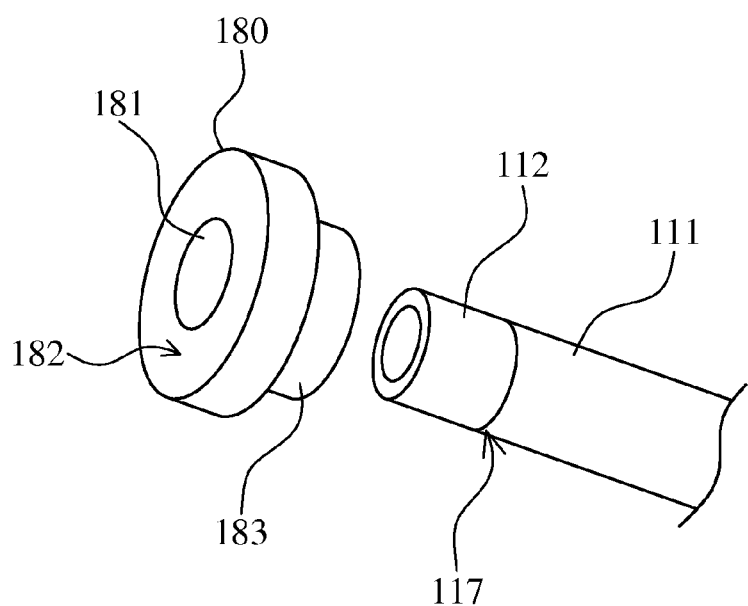
FIG. 7 and FIG. 8 are schematic diagrams showing an assembly of the optical fibers and the fiber fixing collars according to one embodiment of the present invention.
Figure 8:
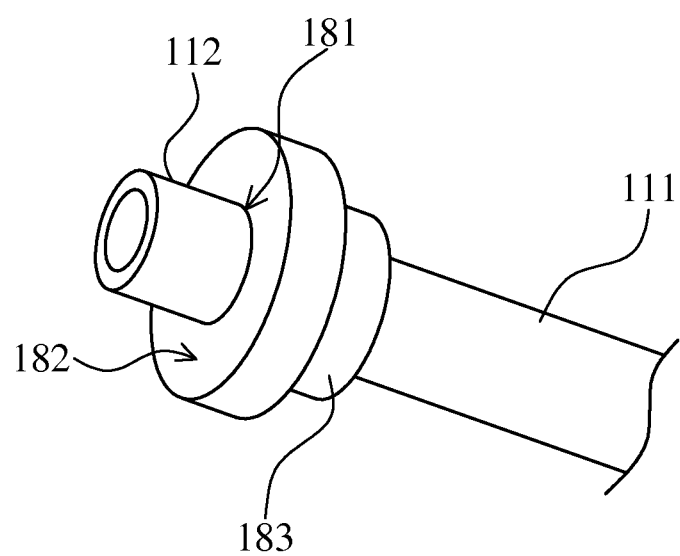
Figure 9:
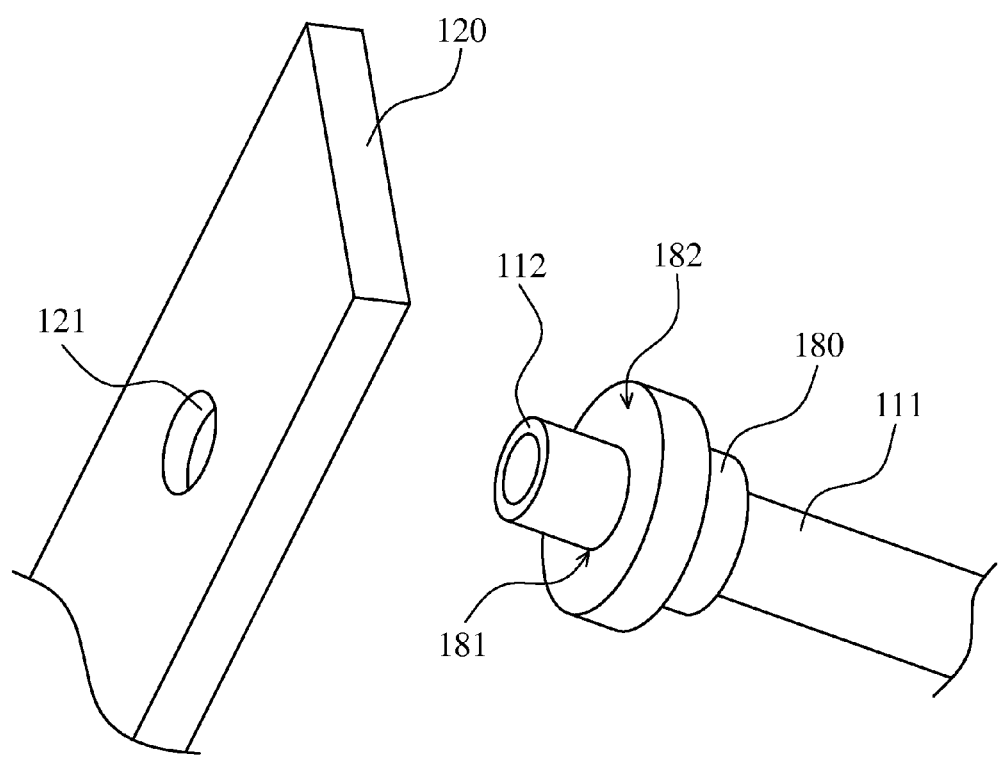
FIG. 9, FIG. 10 and FIG. 11 are schematic diagrams showing an assembly of the fiber light-outputting substrate and the fiber fixing collars according to one embodiment of the present invention.
Figure 10:
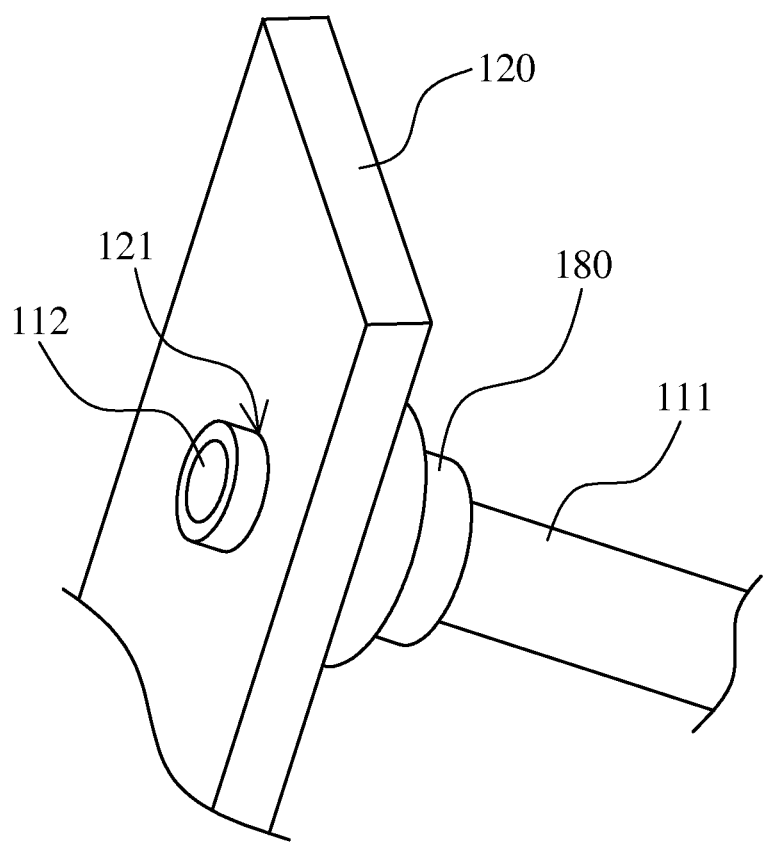
Figure 11:
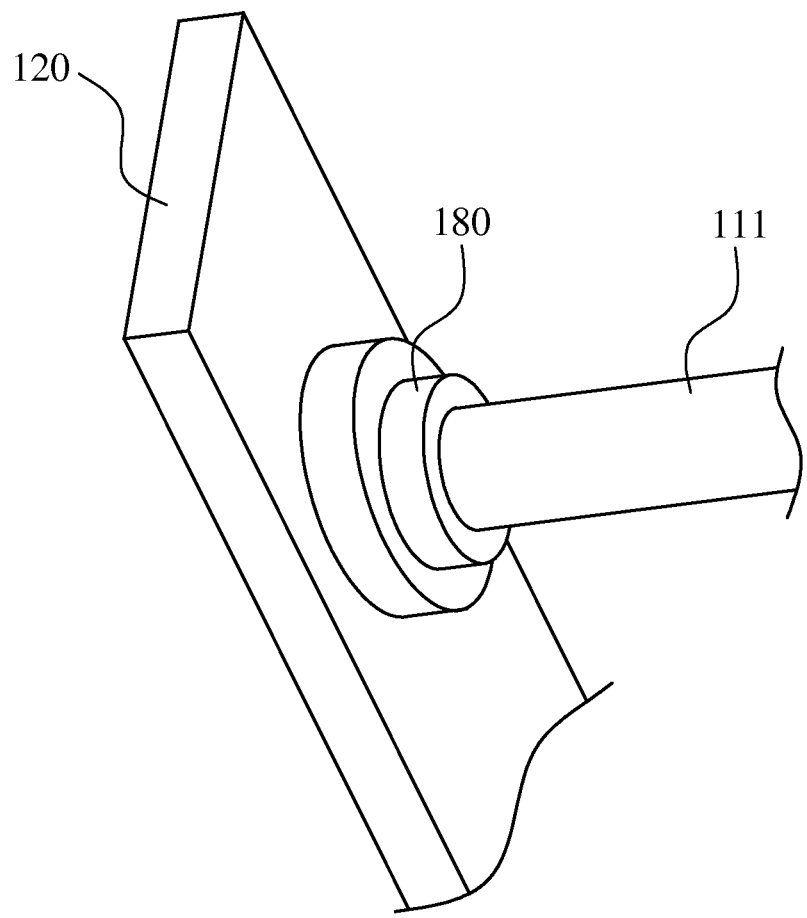

Referring to FIG. 7 and FIG. 8, schematic diagrams showing an assembly of the optical fibers and the fiber fixing collars according to one embodiment of the present invention are illustrated. The fiber fixing collars 180 of the present embodiment may be made of a plastic or metal material. Preferably, the fiber fixing collars 180 are made of a soft material, such as silica gel or rubber, so as to prevent the optical fibers 111 from scratches or any damage. Each of the fiber fixing collars 180 includes a through hole 181, a bonding surface 182 and an extending portion 183. The optical fibers 111 can be inserted in the through holes 181 of the fiber fixing collars 180 and exposing the light-emitting ends 112 thereof. The bonding surface 182 is configured to bond the surface of the fiber light-outputting substrate 120, so as to secure the fiber fixing collars 180 to the fiber light-outputting substrate 120. The through hole 181 can be formed inside the extending portion 183. The extending portion 183 may be tubular for a portion of the optical fiber 111 close to the light-emitting end 112, so as to prevent the portion of the optical fiber 111 close to the light-emitting end 112 from being bent, thereby ensure a light transmitting efficiency of the optical fiber 111.

Referring to FIG. 7 through FIG. 11, FIG. 9, FIG. 10 and FIG. 11 are schematic diagrams showing an assembly of the fiber light-outputting substrate and the fiber fixing collars according to one embodiment of the present invention. When using the fiber fixing collars 180 to assemble the optical fibers 111 and the fiber light-outputting substrate 120, the optical fibers 111 are first inserted into the through holes 181 of the fiber fixing collars 180 and exposing the light-emitting ends 112 thereof. At this time, each of the optical fibers 111 can have a marked line 117 for marking the position of the light-emitting ends 112. When exposing the light-emitting ends 112 of the optical fibers 111, the marked lines 117 of the optical fibers 111 can be aligned with the opening edges of the through holes 181, thereby precisely positioning the light-emitting ends 112 to the fiber fixing collars 180. In this case, the optical fibers 111 can be attached to the fiber fixing collars 180 by an adhesive. After assembling the optical fibers 111 and the fiber fixing collars 180, subsequently, the exposing light-emitting ends 112 can be correspondingly inserted into the light-outputting openings 121 of the fiber light-outputting substrate 120, and the bonding surfaces 182 of the fiber fixing collars 180 can be bonded to the surface of the fiber light-outputting substrate 120 by welding or adhering, thereby attaching and positioning the optical fibers 111 to the fiber light-outputting substrate 120.

It is worth mentioning that the bonding surface 182 of the fiber fixing collars 180 may be bonded to the back bezel 150. Referring to FIG. 5 again, in this case, the light-emitting ends 112 can pass through the through holes 181 of the fiber fixing collars 180, corresponding through holes (not shown) of the back bezel 150 and the light-outputting openings 121 of the fiber light-outputting substrate 120.

When using the backlight module 100 of the present embodiment to provide a backlight source, the optical fibers 111 can transmit the light rays (such as sunlight) collected by the light collector 140 to the light guide plate 130. More specifically, the light rays collected by the light collector 140 can be transmitted by the optical fibers 111, and outputted to the light guide plate 130 from the light-outputting openings 121 of the fiber light-outputting substrate 120. The backlight module 100 can use the ambient light to provide the backlight source, thereby greatly reducing an energy consumption of light sources. Moreover, the ambient light (such as sunlight) can have a wide color gamut, and thus the display apparatus using the backlight module 100 can display images of real color for improving a display quality thereof. In addition, when the ambient light is not sufficient, the light sources 122 of the fiber light-outputting substrate 120 can emit light to compensate the brightness, and thus the backlight module 100 can provide a backlight source of a constant brightness. Furthermore, with the use of the fiber fixing collars 180, the light-emitting ends 112 of the optical fibers 111 can be precisely positioned and secured to the fiber light-outputting substrate 120, thereby ensuring a high efficiency for light energy utilization.

Figure 12:
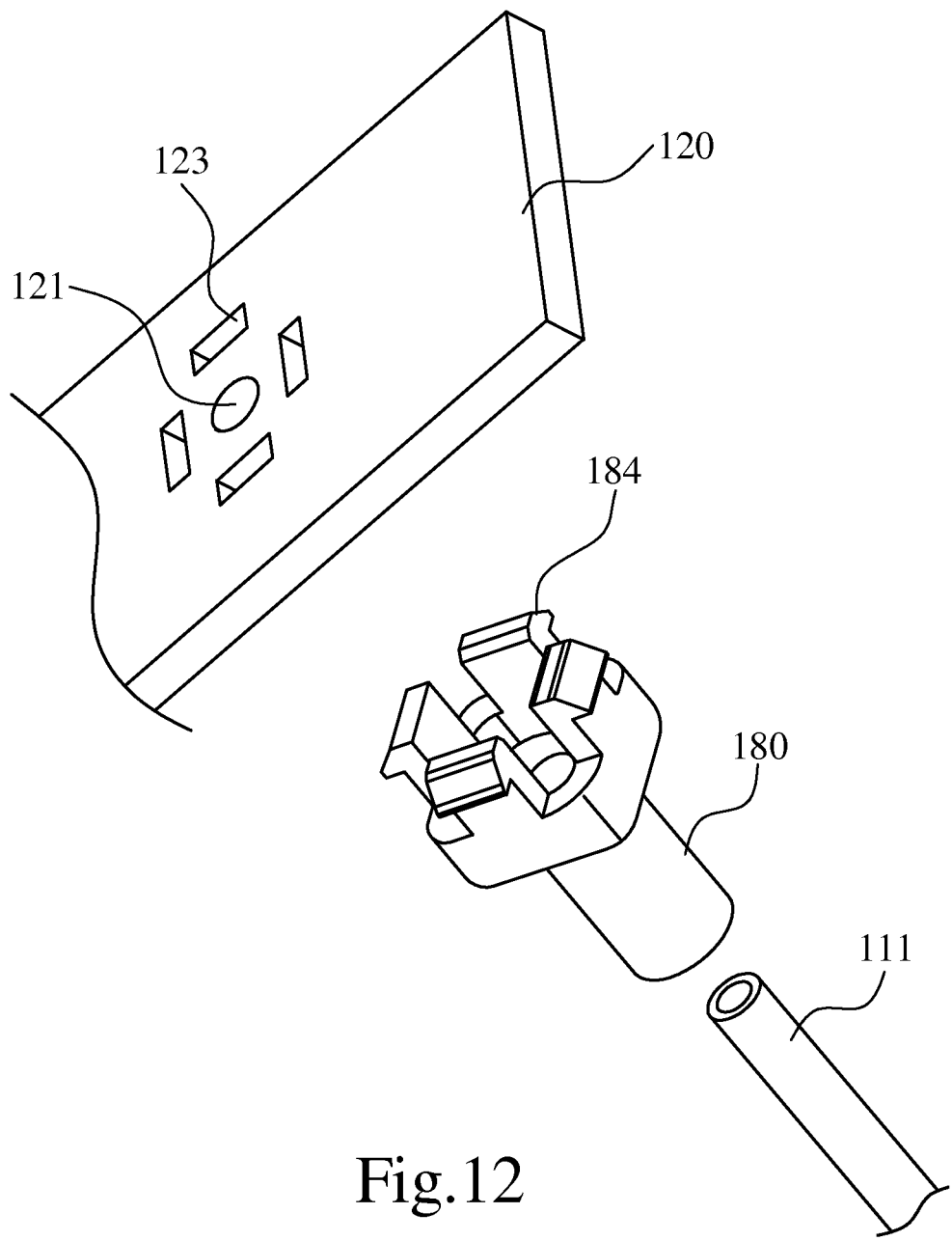
FIG. 12 and FIG. 13 are schematic diagrams showing an assembly of the optical fibers and the fiber fixing collars according to another embodiment of the present invention.
Figure 13:
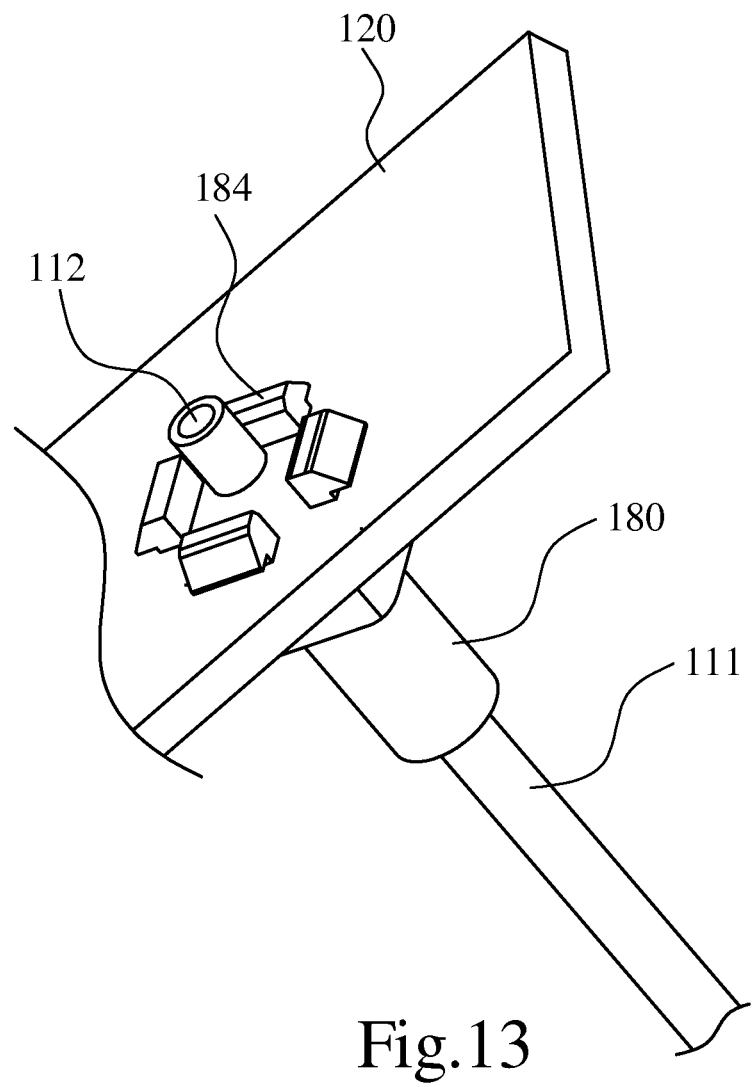

Referring to FIG. 12 and FIG. 13, schematic diagrams showing an assembly of the optical fibers and the fiber fixing collars according to another embodiment of the present invention are illustrated. In another embodiment, each of the fiber fixing collars 180 can comprise a plurality of hooks 184, and the fiber light-outputting substrate 120 further includes a plurality of fixing holes 123 for latching the hooks 184 of the fiber fixing collars 180. Therefore, with the use of the hooks 184 and the fixing holes 123, the fiber fixing collars 180 can be attached to the fiber light-outputting substrate 120 without welding or adhering.

As described above, the backlight module and the display apparatus of the present invention can collect the ambient light rays to form the backlight source, thereby greatly reducing an energy consumption of light sources, as well as improving an image color performance and a display quality of the display apparatus. In addition, when the ambient light is not sufficient, the light sources of the fiber light-outputting substrate can emit light to compensate the brightness, so as to ensure that the backlight source of the backlight module can have a sufficient brightness. Furthermore, with the use of the fiber fixing collars, the light-emitting ends of the optical fibers can be precisely positioned and secured to the fiber light-outputting substrate, thereby ensuring a high efficiency for light energy utilization.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
   a light collector configured to collect ambient light rays;
   a plurality of optical fibers connected to the light collector;
   a fiber light-outputting substrate connected to the optical fibers, wherein the fiber light-outputting substrate includes a plurality of light-outputting openings and a plurality of light sources, and the light-outputting openings are configured to output the light rays transmitted by the optical fibers, and the light sources are arranged on the fiber light-outputting substrate and between the light-outputting openings;
   a light guide plate disposed at one side of the fiber light-outputting substrate, wherein the light guide plate includes a light output surface, a light reflection surface and a light input side surface, and the light output surface is opposite the light reflection surface and faces a liquid crystal display panel, and the light input side surface is formed between the light output surface and the light reflection surface, and the light input side surface faces the light-outputting openings of the fiber light-outputting substrate; and
   a luminous intensity detector disposed on the fiber light-outputting substrate and configured to transmit a detection signal to a processor of the backlight module, and the processer controls the light sources to emit light according to the detection signal, and the processer adjusts a current of the light sources according to the detection signal for controlling a luminous intensity of the light sources, and the light sources are turned off when the luminous intensity detected by the luminous intensity detector is higher than a predetermined threshold value.

2. The backlight module according to claim 1, wherein the light sources are light emitting diodes (LEDs) or organic light emitting diodes (OLEDs).

3. The backlight module according to claim 1, wherein the light sources are turned on when a luminous intensity of the light rays outputted by the light-outputting openings is lower than the predetermined threshold value.

4. The backlight module according to claim 1, further comprising a plurality fiber fixing collars attached to light-emitting ends of the optical fibers for fixing the optical fibers to the fiber light-outputting substrate.

5. The backlight module according to claim 4, wherein each of the fiber fixing collars comprises a plurality of hooks, and the fiber light-outputting substrate further includes a plurality of fixing holes for latching the hooks of the fiber fixing collars.

6. A display apparatus, comprising:
a display panel; and
a backlight module comprising:
a light collector configured to collect ambient light rays;
a plurality of optical fibers connected to the light collector;
a fiber light-outputting substrate connected to the optical fibers, wherein the fiber light-outputting substrate includes a plurality of light-outputting openings and a plurality of light sources, and the light-outputting openings are configured to output the light rays transmitted by the optical fibers, and the light sources are arranged on the fiber light-outputting substrate and between the light-outputting openings;
a light guide plate disposed at one side of the fiber light-outputting substrate, wherein the light guide plate includes a light output surface, a light reflection surface and a light input side surface, and the light output surface is opposite the light reflection surface and faces the display panel, and the light input side surface is formed between the light output surface and the light reflection surface, and the light input side surface faces the light-outputting openings of the fiber light-outputting substrate; and
a luminous intensity detector disposed on the fiber light-outputting substrate and configured to transmit a detection signal to a processer of the backlight module, and the processer controls the light sources to emit light according to the detection signal.

7. The display apparatus according to claim 6, wherein the light sources are light emitting diodes (LEDs) or organic light emitting diodes (OLEDs).

8. The display apparatus according to claim 6, wherein the processer adjusts a current of the light sources according to the detection signal for controlling a luminous intensity of the light sources.

9. The display apparatus according to claim 6, wherein the light sources are turned off when the luminous intensity detected by the luminous intensity detector is higher than a predetermined threshold value.

* * * * *